E. D. REDFIELD.
TIRE LIFTER.
APPLICATION FILED JAN. 30, 1920.
1,371,574.
Patented Mar. 15, 1921.
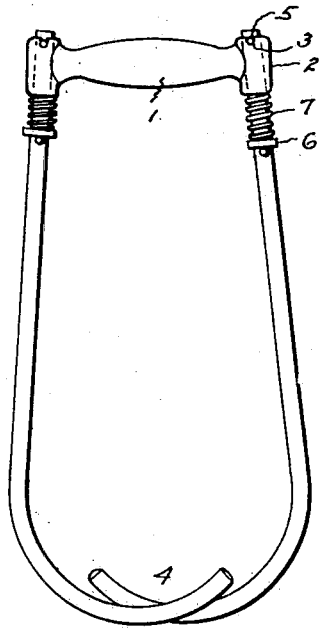
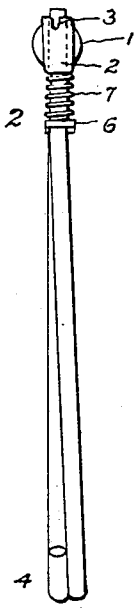
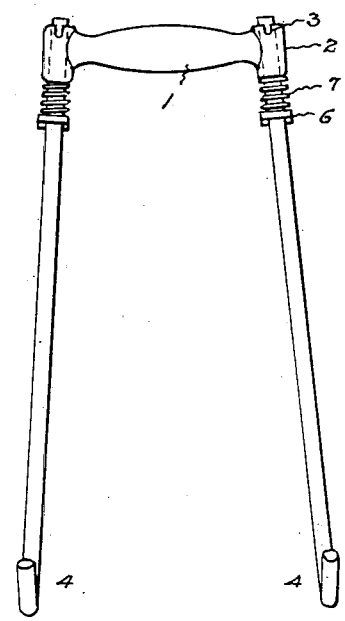
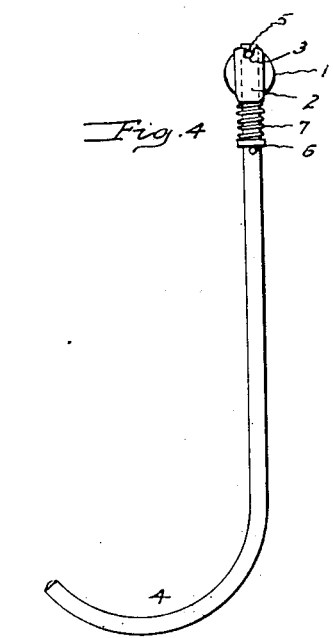
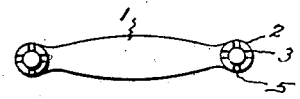
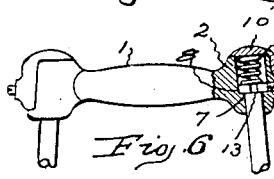
Inventor:
Edward D. Redfield
Harry P. Williams
Atty.

UNITED STATES PATENT OFFICE.

EDWARD D. REDFIELD, OF HARTFORD, CONNECTICUT.

TIRE-LIFTER.

1,371,574.  Specification of Letters Patent.  Patented Mar. 15, 1921.

Application filed January 30, 1920. Serial No. 355,269.

*To all whom it may concern:*

Be it known that I, EDWARD D. REDFIELD, a citizen of the United States, residing at Hartford, in the county of Hartford and State of Connecticut, have invented a new and useful Improvement in Tire-Lifters, of which the following is a specification.

This invention relates to a device which is designed to assist automobilists in handling tires that are being placed upon or removed from wheel rims.

The object of the invention is to provide a very simple and strong device by means of which a heavy tire can be easily lifted and firmly supported with one hand, leaving the other hand free to guide and manipulate the tire into or out of position on the rim, thus facilitating the task of changing tires, which device can be quickly opened for use or closed into a compact space for storing or transporting.

The invention contemplates the provision of a handle that can be easily grasped with one hand, and hooks adjustably connected with the ends of the handle in such manner that they may be folded together flatwise for storing, or turned out for engaging and grasping the rim of a tire.

Figure 1 of the accompanying drawings shows a front view of a device that embodies the invention, with the supporting hooks folded for storing. Fig. 2 shows an edge view of the same. Fig. 3 shows a front view with the hooks turned out in position for use. Fig. 4 shows an edge view with the hooks open. Fig. 5 is a top view of the handle. Fig. 6 is a section of one end of the handle showing a modified way of connecting the end of the hooks with the handle.

The handle 1 may be cast or otherwise formed of suitable metal, as brass or iron, to any desired and convenient outline preferably with hubs 2 at the ends. Circular perforations are drilled through the hubs at the ends of the handle and slots 3 are milled across the upper surfaces of the hubs radially of these perforations. The hooks 4 are formed to the required shape, preferably of steel rod that is circular in cross section. The shank ends of the hooks extend loosely through the perforations in the hubs at the ends of the handle and pins 5 are driven through the hook-shanks near their ends in position to occupy the radial slots in the upper ends of the hubs. On the hook-shanks, and thrusting between the lower ends of the handle hubs and collars 6 fixed on the shanks are springs 7. These springs normally press the hook-shanks down and hold them with the pins in the radial slots so the hooks cannot turn. By pressing the hooks up the pins are freed from the slots and then the hooks may be turned either together flatwise as shown in Fig. 1, or outward as shown in Fig. 3.

In the modified arrangement for connecting the hooks and handle the openings through the hubs are made somewhat larger in diameter at their upper than at their lower ends to provide internal shoulders 7. In this case the ends of the hook-shanks are provided with heads 8 which are larger in diameter than the lower sections of the openings, and the springs 9 are arranged in the larger upper sections of the openings so as to normally press the heads on the ends of the hook-shanks down upon the shoulders 7. Caps 10 placed over the openings retain the springs in place and these caps are desirably formed with skirts 11 that extend down upon the outside of the hubs and are secured in place by screws 12 which are threaded into the hubs. In the edges of the heads on the ends of the hook-shanks are notches 13 and the inner ends of the cap securing screws are designed to project into these notches to normally hold the hooks from turning.

In both forms to adjust the hooks from one position to the other, they are pressed upward against the thrust of the springs until the pins or heads are free from the slots or screws, then the hooks are turned to the desired position and released, when the springs will press them down so the pins or screws will lock them in the positions to which they were turned.

The invention claimed is:—

1. A tire lifter comprising a bar with a transverse opening through each end and two independent hooks with their shanks extending through and rotatably held in said openings in the ends of the bar.

2. A tire lifter comprising a handle and hooks with their shank ends rotatably held in transverse openings at the ends of the handle.

3. A tire lifter comprising a handle, hooks with their shank ends rotatably held in transverse openings at the ends of the handle, and means for retaining the hooks in the positions to which they are turned.

4. A tire lifter comprising a handle, hooks with their shank ends rotatably held in transverse openings at the ends of the handle, means for temporarily locking the hooks against rotation, and springs normally holding the hooks with the locking means in engagement.

EDWARD D. REDFIELD.